(12) United States Patent
Sakai

(10) Patent No.: US 7,813,901 B2
(45) Date of Patent: Oct. 12, 2010

(54) SKETCH GENERATOR FOR 3D SHEET METAL PART MODELS CREATED BY SHEET METAL PART FEATURE OPERATIONS

(75) Inventor: Satoshi Sakai, Newport Beach, CA (US)

(73) Assignee: Amada Company, Limited, Kanagawa (JP)

( * ) Notice: Subject to any disclaimer, the term of this patent is extended or adjusted under 35 U.S.C. 154(b) by 786 days.

(21) Appl. No.: 10/971,125

(22) Filed: Oct. 25, 2004

(65) Prior Publication Data

US 2006/0089747 A1    Apr. 27, 2006

(51) Int. Cl.
G06F 17/50 (2006.01)
G06F 19/00 (2006.01)

(52) U.S. Cl. .............................. 703/1; 700/98; 700/145; 700/165

(58) Field of Classification Search .................... 703/6, 703/7, 1; 715/850–853; 345/419, 420; 700/98, 700/182, 104, 165, 180, 145; 706/55, 919
See application file for complete search history.

(56) References Cited

U.S. PATENT DOCUMENTS

| | | | |
|---|---|---|---|
| 4,912,644 A | 3/1990 | Aoyama et al. | |
| 5,029,462 A | 7/1991 | Wakahara et al. | |
| 5,089,970 A | 2/1992 | Lee et al. | |
| 5,115,400 A | 5/1992 | Watanabe et al. | |
| 5,237,647 A | 8/1993 | Roberts et al. | |
| 5,278,983 A | 1/1994 | Kawabe et al. | |
| 5,307,282 A | 4/1994 | Conradson et al. | |
| 5,315,522 A | 5/1994 | Kauffman et al. | |
| 5,396,265 A | 3/1995 | Ulrich et al. | |
| 5,414,801 A | 5/1995 | Smith et al. | |
| 5,429,682 A | 7/1995 | Harlow et al. | |
| 5,701,403 A | 12/1997 | Watanabe et al. | |
| 5,812,137 A | 9/1998 | Kerker et al. | |
| 5,815,154 A * | 9/1998 | Hirschtick et al. | ........... 715/853 |
| 5,822,207 A | 10/1998 | Hazama et al. | |
| 5,828,575 A | 10/1998 | Sakai | |
| 5,835,684 A | 11/1998 | Bourne et al. | |

(Continued)

FOREIGN PATENT DOCUMENTS

EP    0290809    11/1988

(Continued)

OTHER PUBLICATIONS

"extrusion"—Definitions from Dictionary.com. Printed Jun. 23, 2007. http://dictionary.reference.com/browsw/extrusion.*

(Continued)

*Primary Examiner*—Paul L Rodriguez
*Assistant Examiner*—Andre Pierre Louis
(74) *Attorney, Agent, or Firm*—Greenblum & Bernstein, P.L.C.

(57) ABSTRACT

A method is provided for guaranteeing generation of 2D sketches based upon a 3D sheet metal part shape created by any type of sheet metal feature operation. The method includes performing a sheet metal feature operation to create the 3D sheet metal shape. The 3D sheet metal shape will have multiple flanges. Then an editable 2D sketch is created for each flange by obtaining geometric parameters of the 3D sheet metal shape, and linking the parameters with the appropriate generated sketch. The constraint parameters can include line segment lengths and angles between selected adjoining two line segments of the 3D sheet metal shape.

20 Claims, 7 Drawing Sheets

U.S. PATENT DOCUMENTS

| | | | |
|---|---|---|---|
| 5,864,482 | A | 1/1999 | Hazama et al. |
| 5,886,897 | A | 3/1999 | Hazama et al. |
| 5,889,926 | A | 3/1999 | Bourne et al. |
| 5,969,973 | A | 10/1999 | Bourne et al. |
| 5,971,589 | A | 10/1999 | Hazama et al. |
| 6,065,857 | A | 5/2000 | Hazama et al. |
| 6,144,896 | A | 11/2000 | Kask et al. |
| 6,185,476 | B1 | 2/2001 | Sakai |
| 6,219,049 | B1* | 4/2001 | Zuffante et al. ............. 715/764 |
| 6,219,055 | B1* | 4/2001 | Bhargava et al. ............ 715/850 |
| 6,219,586 | B1 | 4/2001 | Sakai |
| 6,243,611 | B1 | 6/2001 | Hazama et al. |
| 6,308,144 | B1 | 10/2001 | Bronfeld et al. |
| 6,327,514 | B1 | 12/2001 | Hazama et al. |
| 6,337,685 | B2 | 1/2002 | Nagakura |
| 6,341,243 | B1 | 1/2002 | Bourne et al. |
| 6,493,603 | B1 | 12/2002 | Haeberli |
| 6,493,607 | B1 | 12/2002 | Bourne et al. |
| 6,507,767 | B2 | 1/2003 | Bourne et al. |
| 6,539,399 | B1 | 3/2003 | Hazama et al. |
| 6,542,937 | B1 | 4/2003 | Kask et al. |
| 6,550,302 | B1* | 4/2003 | Ghosh ....................... 72/342.8 |
| 6,684,116 | B1 | 1/2004 | Scott |
| 6,771,260 | B1* | 8/2004 | Hazama et al. ............. 345/420 |
| 7,160,047 | B2* | 1/2007 | Mueller et al. .............. 403/283 |
| 2001/0043236 | A1 | 11/2001 | Yamamoto |
| 2002/0038163 | A1* | 3/2002 | Hazama ...................... 700/165 |
| 2006/0059855 | A1* | 3/2006 | Goldenberg ............ 52/745.19 |
| 2006/0079989 | A1* | 4/2006 | Ishii et al. ................... 700/182 |
| 2006/0293776 | A1* | 12/2006 | Hillman et al. ............... 700/98 |

FOREIGN PATENT DOCUMENTS

| | | |
|---|---|---|
| EP | 0402475 | 12/1990 |
| EP | 0419013 | 3/1991 |
| EP | 0485766 | 5/1992 |
| EP | 0397904 | 7/1994 |
| EP | 0644186 | 7/1995 |

OTHER PUBLICATIONS

Beattie, Cliff. "The Scoop on SolidWorks 2001." May 5, 2001. http://www.digitalcad.com/2001/05_may/reviews/solidworks/solidworks1.htm.*

SolidWorks Corporation. "SolidWorks Corporation Introduces SolidWorks® 2001." © Jan. 22, 2001. http://www.solidworks.com/pages/popups/viewrelease.html?prfile=01-22-2001.html.*

SolidWorks Corporation. "eDrawings Professional: A Breakthrough in Product Design Communication." © 2001. http://www.javelin-tech.com/mail/products/edrawings.pdf.*

Javelin Technologies. "SolidWorks Releases: Solidworks 2000-2007." © 2007. Printed Jun. 22, 2007. http://www.javelin-tech.com/main/support/solidworks_releases.htm.*

CAD-Reviews.com. "Review of Solidworks 2001 from SolidWorks Corporation." Archive review from Apr. 8, 2001. http://www.cad-reviews.com/20010408-solidworks2001-review-1.html.*

SolidWorks Express Newsletter. "Simplify the Creation of Sheet Metal Concepts." Sep. 2003. http://www.solidworks.com/swexpress/sept03/200308_techtip_02p.html.*

Lombard, Matt. "SolidWorks Sheetmetal." CVSWUG meeting, Oct. 20, 2005. http://www.dezignstuff.com/cvswug/cvswugsheetmetal.ppt.*

SolidWorks Corporation. "SolidWorks 2004 What's New." © 1995-2003. pp. iii-xi, and 4-2 to 4-5.*

SolidWorks Corporation. "SolidWorks 2006 What's New." © 1995-2005. pp. iii-xi, and 10-6 to 10-8.*

Info Forum on Sheet Metal Design, Aug. 2004.*

S.P. Tebboth, Hint on the use of Pro-Engineer for Sheet Metal Design, 2004.*

Chu, Wesley W., et al., *Cooperative Query Answering Via Type Abstraction Hierarchy*, Computer Science Department Technical Report, CSD-900032, Department of Computer Science, University of California, Los Angeles, pp. 1-28 (Oct. 1990).

Chiang, Kuorong, *Automatic Generation of Type Abstraction Hierarchies For Cooperative Query Answering* (A dissertation submitted as part of the requirements for the degree of Doctor of Philosophy in Computer Science), University of California, Los Angeles, pp. 1-98 (1995).

Mortenson, Michael E., *Geometric Modeling* (Title page & Table of Contents), John Wiley & Sons, New York, (1988).

Foley, James D., et al., *The Systems Programming Series: Fundamentals of Interactive Computer Graphics*, (Title Page & Table of Contents), Addison-Wesley Publishing Co., Reading, Massachusetts (Mar. 1983).

Mantyla, Martti, *An Introduction to Solid Modeling* (Title Page & Table of Contents), Computer Science Press, Inc., Rockville, Maryland (1988).

Wesley, M.A., et al., "Fleshing Out Projections", *IBM J. Res. Develop.*, vol. 25, No. 6, pp. 934-954 (Nov. 1981).

Aomura, Shigeru, et al., "Creating Solid Model With Machine Drawings", *The Sixth Computational Mechanics Conference*, JSME, No. 930-71, pp. 497-498, Japan (1983).

Aomura, Shigeru, "Recent Trends And Future Prospect Of Research And Practical Use (Automatic Reconstruction of 3D Solid From Drawings)", JSME, No. 586-61, pp. 2180-2187, Japan (1995).

Open GL Architecture Review Board, *Open GL Reference Manual* (Title Page & Table of Contents), Release 1, Open GL Architecture Review Board, Addison-Wesley Publishing Co., Reading, Massachusetts (Jan. 1995).

Open GL Architecture Review Board, *Open GL Programming Guide* (Title Page & Table of Contents), Release 1, Open GL Architecture Review Board, Addison-Wesley Publishing Co., Reading, Massachusetts (Jun. 1995).

Criterion Software Ltd., *RenderWare, API Reference Manual* (Title Page & Table of Contents), V2.0, Criterion Software Ltd., United Kingdom (Oct. 1995).

Toyo Engineering Corp. (TEC), *2D-3D: UNKEI/Solid and UNKEI/Drawing Check & Projection/Reconstruction System*, Sales Brochure, Toyo Engineering Corp. (TEC), Tokyo, Japan (1993).

Naessens, Diederik, "Flexible Automation On Press Brakes", *American Machinist*, pp. 36-39 (Jun. 1994).

Wysong Literature, *The Perfect Forming Touch: New, PH PLUS Series, DNC Press Brakes*, Cat. PHP-1, Wysong & Miles Company, Greensboro, North Carolina (1993).

Bourne, David A., "Intelligent Manufacturing Workstations", *Knowledge-Based Automation of Processes*, Session at the 1992 ASME Winter Annual Meeting (Nov. 1992).

Bourne et al., "Using the Feature Exchange Language in the Next Generation Controller," CMU-RI-TR-90-19, *The Robotic Institute at Carnegie Mellon University*, Pittsburgh, PA (Aug. 1990).

Bourne et al., "Operational Feature Exchange Language," CMU-RI-TR-90-06, *The Robotic Institute at Carnegie Mellon University*, Pittsburgh, PA (Mar. 1990).

Nilsson, Nils J., "Problem-Solving Methods in Artificial Intelligence", McGraw-Hill Book Company, New York, Chapter 3, pp. 43-67 (1971).

Erion, "Generic Environment for LISP Based Experts", Center for Integrated Manufacturing Decision Systems, Carnegie Mellon University, pp. 113-136 (Mar. 1990).

Bourne, D., et al., "Feature Exchange Language Programmer's Guide", The Robotics Institute at Carnegie Mellon University, Pittsburgh, PA (Jan. 1994).

Trappey et al., "A Data Representation scheme for Sheet Metal Parts: Expressing Manufacture and Features and Tolerance Requirements," *Journal of Manufacturing Systems*, vol. 14, No. 6, pp. 393-405, ISSN-0278-6125 (1995).

Wang, Cheng-Hua, "A Parallel Design System For Sheet Metal Parts", *Mechanical Engineering Report*, presented to the Mechanical Engineering Department, Carnegie Mellon University, Pittsburgh, Pennsylvania, pp. 1-31 (May 1992).

Wang, Cheng-Hua, et al., "Concurrent Product/Process Design With Multiple Representations Parts", IEEE, No. 1050-4729/93, pp. 298-304 (1993).

U.S. Amada, Ltd., *Amada Unfold: Manual for Autocad*, Table of Contents,. Index & pp. 1-28, U.S. Amada, Ltd., Buena Park, California (Mar. 1994).

U.S. Amada, Ltd., *Amada Unfold: Manual for Cadkey*, Table of Contents, Index & pp. 1-18, U.S. Amada, Ltd., Buena Park, California (May 1994).

U.S. Amada, Ltd., *Amada Windows Unfold: Manual for Cadkey*, Table of Contents, pp. 1-35, & Index, U.S. Amada, Ltd., Buena Park California (Nov. 1995).

Amada Co., Ltd., *AMACOM: AP40 Literature*, Version 4, Amada Co., Ltd., Japan (Jul. 1996).

Amada Co., Ltd., *AMACOM: AP60 Literature*, Amada Co., Ltd., Japan (Jul. 1996).

Amada Co., Ltd., *AMACOM: AP200 Literature*, Amada Co., Ltd., Japan (Jul. 1996).

Amada Co., Ltd., *Bending Soft*, Literature on the AMACOM AP40, No. 9112-01, Amada Co., Ltd., Japan (Dec. 1991).

SPI GmbH, "Sheetmetal Desktop 3.01", Ahrensburg, Germany, published 1998, (http://www.spi.de/sheetmet/sml.htm).

SPI GmbH, "Sheetmetal AutoCAD 2000", Ahrensburg, Germany, published 1999, (http://www.spi.de/sheetmet/sma/htm).

IBM, "Method For Understanding Drawing Attributes for 3D Models", IBM Technical Disclosure Bulletin, vol. 37, No. 07, pp. 99-104 (Jul. 1994).

Tseng, Yuan-Jye, et al., "Recognizing Multiple Interpretations Of Interacting Machining Features", Computer-Aided Design, vol. 26, No. 9, pp. 667-688 (Sep. 1994).

Gu, P., et al., "Product Modelling Using STEP", Computer-Aided Design, vol. 27, No. 3, pp. 163-179 (Mar. 1995).

Papanikolopoulos, Nikolaos P., "FORS: A System For Flexible Design," *Conference Proceedings: 1990 IEEE International Conference On Systems, Man, And Cybernetics*, Los Angles, California, pp. 724-726, Nov. 4-7, 1990.

Patent Abstracts of Japan, vol. 018, No. 689 (P-1850), Dec. 26, 1994 & JP 06 274219 (Mutoh Ind. Ltd.).

U.S. Appl. No. 10/987,220 to Sakai et al., filed on Nov. 15, 2004.

U.S. Appl. No. 10/245,313 to Ishii et al., filed on Sep. 18, 2002.

English language Abstract of JP-3193196.

Amada Co., Ltd, "SheetWorks for Unfold Ver. 7 User's Guide" 2004.

\* cited by examiner

SKETCH GENERATOR FOR 3D SHEET METAL PART MODELS CREATED BY SHEET METAL PART FEATURE OPERATIONS

BACKGROUND OF THE INVENTION

1. Field of the Invention

The present invention relates to the field of computer-aided design for sheet metal parts. More particularly, the present invention relates to guaranteeing sketches for every flange of a 3D sheet metal part, no matter how the part was generated.

2. Background Information

Sheet metal part designers typically think of flanges as 2D problems. When designing a new 3D sheet metal shape on a computer-aided design (CAD) system, it is therefore often more convenient and simpler for sheet metal designers and manufacturers to operate with 2D representations at the flange level. Current 3D CAD systems, however do not guarantee 2D sketches for every 3D sheet metal part. Thus, the sheet metal manufacturing industry is not widely using 3D CAD systems for sheet metal part design.

One easy way to create a basic 3D sheet metal part shape (which can be modified later) is to use a sheet metal feature operation, such as a profile extrusion, as seen in FIG. 1A. Unfortunately, current 3D sheet metal CAD systems do not generate 2D sketches for parts created by all sheet metal feature operations. For example, current systems represent a shape created by a profile extrusion operation with a single profile sketch and its material property. That is, 2D sketches for each created flange are not generated. Consequently, it is difficult for the designer to alter the shape of the flanges of the 3D part.

Currently, an editing operation of even a simple flange requires a patchwork process involving 2D and 3D manipulations, an example of which is shown in FIG. 1B. More specifically, after creating a flange 1, the user enters a sketch mode (which shows the flange 1 being edited in 2D) and then creates a 2D shape 2 that will be added to or deleted from the original flange 1. In this example, the shape will be added. The user must then convert the 2D shape 2 into a solid shape 3, and then blend the solid shape 3 with the original flange 1 to create the modified flange 4.

Not only is the editing process overly complicated, but the display showing a previously edited part is unnecessarily cluttered. Typically, the user is not interested in seeing how the part was created. As seen in FIG. 1C, however, a flange 5 that had been edited by adding the new portions 6, 7, 8 shows the history of shapes that were used to created the edited flange. Thus, the user is required to view the patchwork process used to create the edited part when making further edits. In other words, in systems of the prior art the screen becomes unnecessarily cluttered.

It would be desirable to have a software application that permits easy editing of a 3D part created by any type of sheet metal feature operation. Such a system should create sketches for each flange of the 3D part to permit easy editing of the flange in 2D.

SUMMARY OF THE INVENTION

In view of the foregoing, the present invention is directed to generating sketches for each flange of a 3D sheet metal shape generated by every type of sheet metal feature operation.

In one embodiment, a method is provided for guaranteeing generation of 2D sketches based upon a 3D sheet metal part shape. The method includes performing a sheet metal feature operation to create the 3D sheet metal shape, which has multiple flanges. The method also includes generating an editable 2D sketch for each flange to facilitate editing the 3D sheet metal shape. Thus, sketches are generated for any type of feature operation used to create the 3D sheet metal shape.

The generating may include obtaining parameters based upon the 3D sheet metal shape to generate each 2D sketch. In one embodiment, the sheet metal feature operation is a miter flange operation.

The method may also include linking constraint parameters of the created 3D sheet metal part shape with each generated sketch. The linking may include linking lengths of lines in the 3D sheet metal shape to lengths of each generated sketch. The linking may also include linking angles between selected adjoining lines of the 3D sheet metal shape to corresponding angles between generated sketches.

In one aspect, the sheet metal feature operation is a profile extrusion created from a profile and an extrusion length. In this case, the parameters are lengths of each line segment in the profile and the extrusion length. Each length of a line segment and the extrusion length make up the geometry of one of a several rectangles that each correspond to one of the sketches. Each sketch is associated with one of the line segments.

In yet another aspect of the present invention, a computer readable medium stores a program for guaranteeing generation of 2D sketches based upon a 3D sheet metal part shape. The program includes a sheet metal feature operation code segment and a sketch generating code segment. The sheet metal feature operation code segment performs a sheet metal feature operation to create the 3D sheet metal shape, which has multiple flanges. The sketch generating code segment generates an editable 2D sketch for each flange to facilitate editing the 3D sheet metal shape. Thus, sketches are generated for every type of feature operation used to create the 3D sheet metal shape.

The sketch generating code segment may also include a parameter code segment that obtains parameters based upon the 3D sheet metal shape to generate each 2D sketch. The sheet metal feature operation may be a miter flange operation.

In one embodiment, a linking code segment is provided to link constraint parameters of the created 3D sheet metal part shape with each generated sketch. The linking code segment may links lengths of lines in the 3D sheet metal shape to lengths of each generated sketch. The linking code segment may also link angles between selected adjoining lines of the 3D sheet metal shape to corresponding angles between generated sketches.

In another embodiment, the sheet metal feature operation is a profile extrusion operation that creates the 3D shape from a profile and an extrusion length. In this case, the parameters are lengths of each line segment in the profile and the extrusion length. Each length of a line segment and the extrusion length make up the geometry of one of a group of rectangles that corresponds to one of the sketches. Each sketch is associated with one of the line segments.

In another aspect of the present invention, a computer executes software for guaranteeing generation of 2D sketches based upon a 3D sheet metal part shape. The computer includes memory and a processor. The processor performs a sheet metal feature operation to create the 3D sheet metal shape, which has multiple flanges, in response to a user's input. The processor also generates an editable 2D sketch for each flange to facilitate editing the 3D sheet metal shape. Thus, sketches are generated for every type of feature operation used to create the 3D sheet metal shape.

The processor may obtain parameters based upon the 3D sheet metal shape to generate each 2D sketch. The processor may link constraint parameters of the created 3D sheet metal part shape with each generated sketch by linking lengths of lines in the 3D sheet metal shape to lengths of each generated sketch, and/or linking angles between selected adjoining lines of the 3D sheet metal shape to corresponding angles between generated sketches.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION

The present invention is directed to a system that guarantees sketches for each flange of a 3D sheet metal part created by any type of 3D sheet metal feature operation. The system may include software running on a computer including a processor and memory, such as random access memory (RAM).

Figure 2:
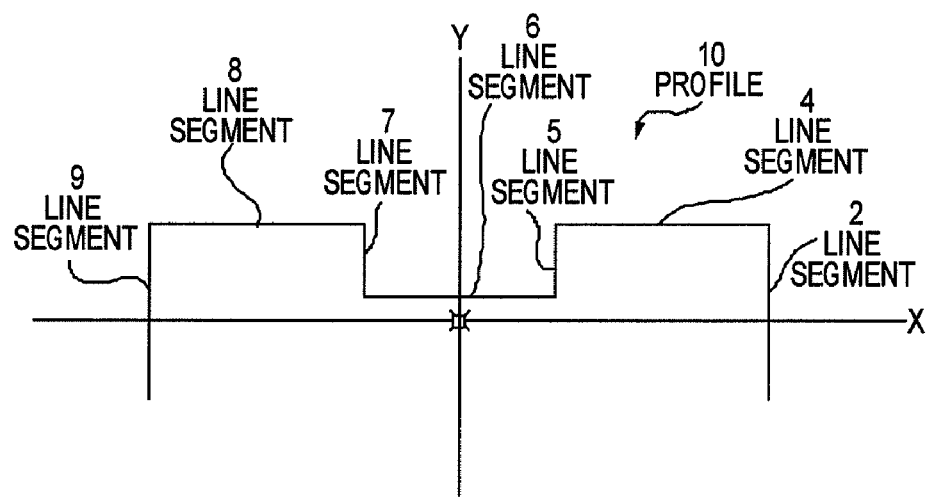
FIG. 2 illustrates a profile that can be used with a profile extrusion operation to create a 3D sheet metal part shape, in accordance with an aspect of the present invention.

Sheet metal feature operations are operations that permits quick and easy creation of complex sheet metal shapes. A profile extrusion operation will now be described with reference to FIG. 2. A profile 10 can be drawn. In FIG. 2, an X-Y axis is also shown. The profile shown in FIG. 2 includes a set of seven continuous line segments 2, 4, 5, 6, 7, 8, 9 that define the profile.

Figure 3:
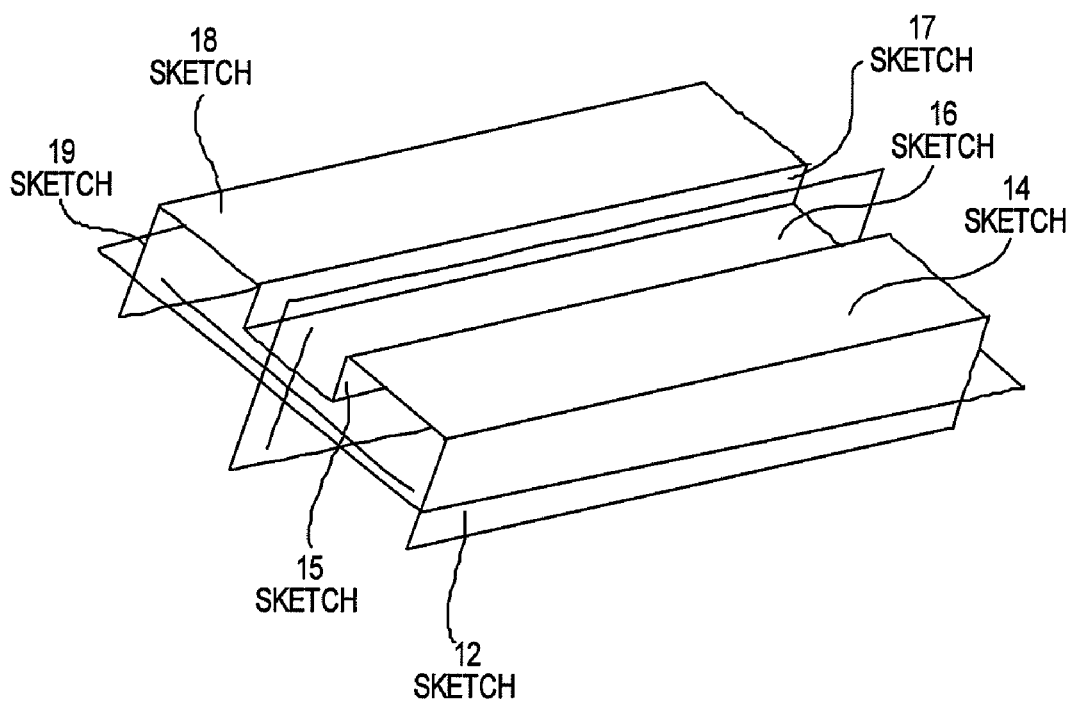
FIG. 3 illustrates a 3D sheet metal part shape created by a profile extrusion operation and the profile of FIG. 2, in accordance with an aspect of the present invention.

After the profile is created, an extrusion operation is performed. The sheet metal part designer can select the length of the extrusion. The designer can also select a thickness of the material of the part. FIG. 3 shows the profile after it has been extruded and thickness has been added. As seen in FIG. 3, seven different flanges (i.e., faces) 12, 14, 16, 18, 20, 22, 24 result from the extrusion of the profile 10. A flange will refer to a single flange of a sheet metal part in a 3D CAD system. According to an aspect of the present invention, each flange is represented by a 2D sketch and material properties, e.g., 3 mm aluminum.

Figure 1A:
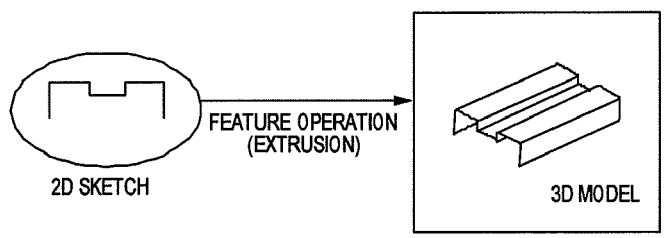
FIGS. 1A, 1B, and 1C show a 3D part created by a prior art profile extrusion operation, editing of that part according to the prior art process, and a prior art display of a previously edited part.
Figure 4:
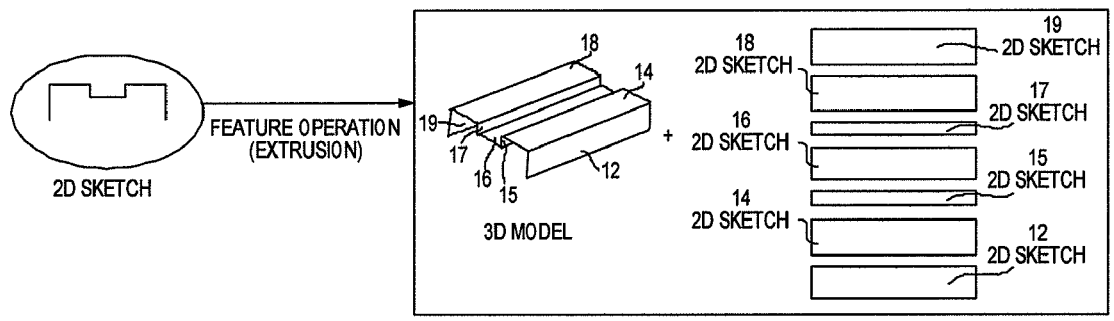
FIG. 4 shows a 3D model and corresponding sketches that are generated as a result of a feature operation, according to an aspect of the present invention.
Figure 1B:
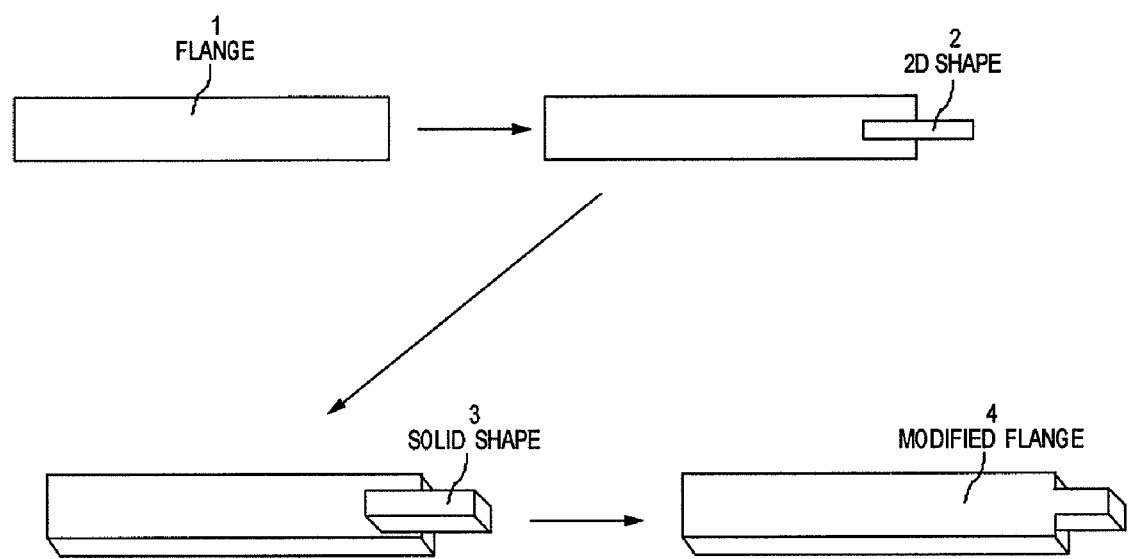
Figure 1C:
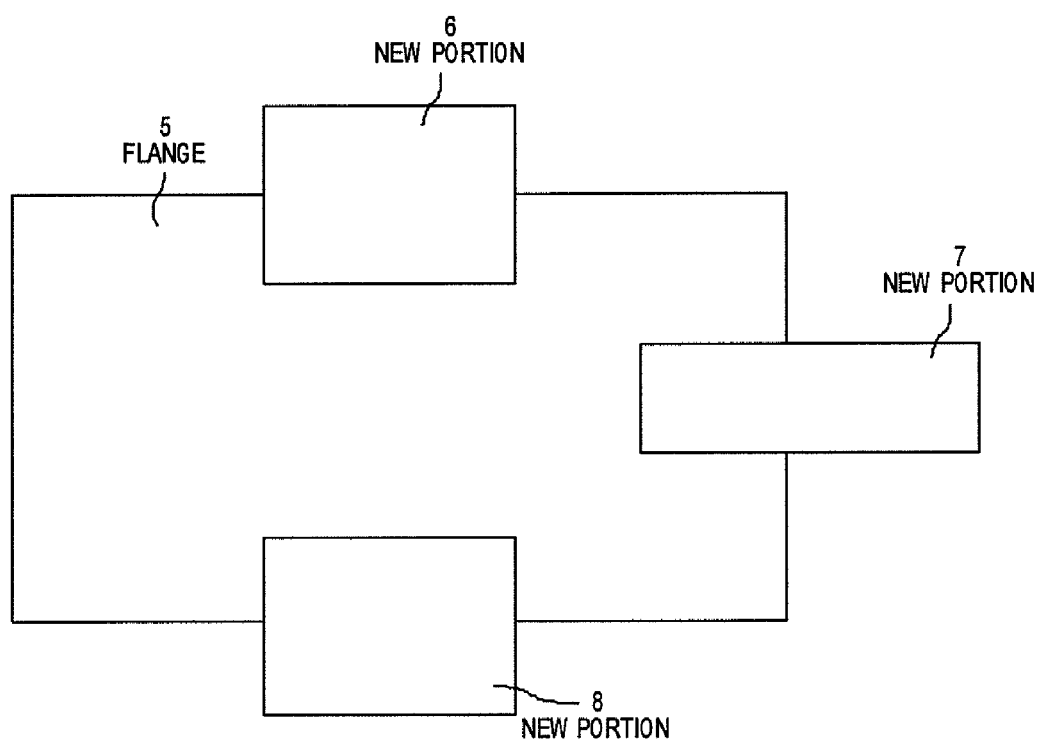
Figure 5:
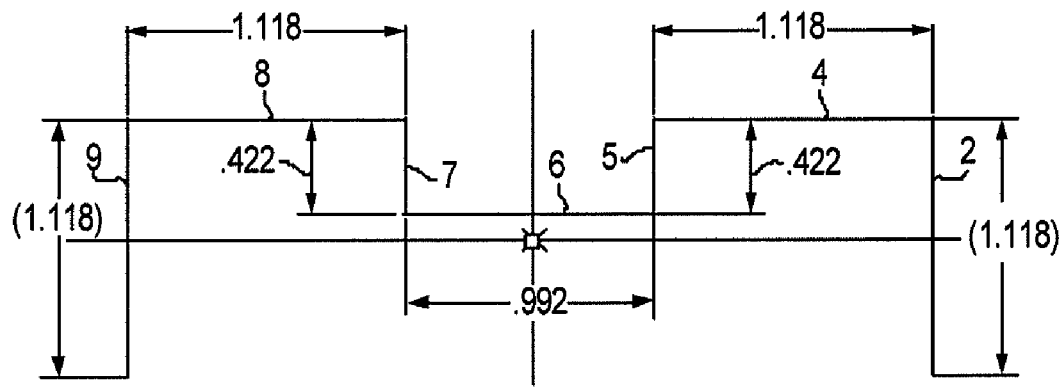
FIG. 5 shows an example of dimensional constraints of the profile of FIG. 2, according to an aspect of the present invention.
Figure 6:
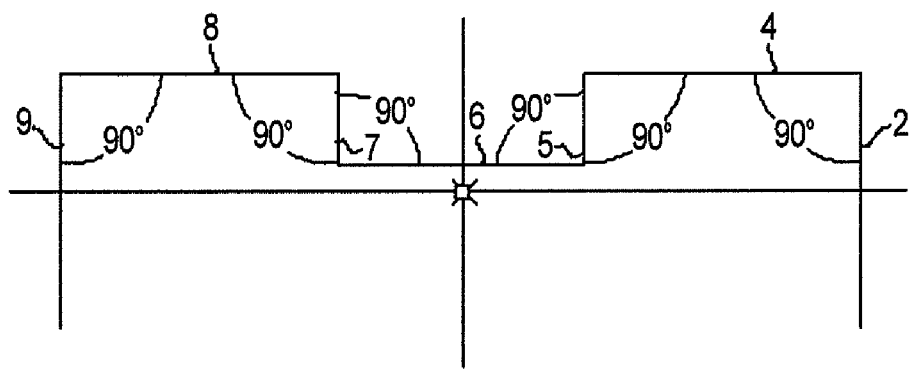
FIG. 6 shows an example of angular constraints of the profile of FIG. 2, according to an aspect of the present invention.

Creation of the sketches for the profile extrusion, shown in FIG. 3, is now discussed with reference to FIGS. 4, 5, and 6. Because the profile extrusion operation generates flanges that are rectangular, the sketches resulting from this particular sheet metal part feature operation are also rectangular. FIG. 4 shows that along with the 3D model, sketches 12, 14, 15, 16, 17, 18, 19 are generated as result of the feature operation, according to the present invention.

First, the constraints associated with the initial profile 10 are determined. FIG. 5 illustrates the length of each line 2, 4, 5, 6, 7, 8, 9 of the profile 10. The extrusion length is also determined. In this example, it will be assumed that the extrusion has a length of 10 units. The dimensions of each sketch can then be calculated. For example, lines 2, 4, 8, and 9 have a length of 1.118 (as seen in FIG. 5). Lines 5 and 7 each have a length of 0.422. Line 6 has a length of 0.992.

Thus, the rectangle based on line 2 has four sides having the lengths 1.118, 10, 1.118, and 10. The dimensions of each other rectangle (defining each other sketch) can be determined in a similar manner. That is, the rectangles corresponding to lines 4, 8, and 9 have dimensions 1.118, 10, 1.118, and 10. The rectangles corresponding to lines 5 and 7 have dimensions 0.422, 10, 0.422, and 10. Finally, the rectangle corresponding to line 6 has dimensions 0.992, 10, 0.992, and 10.

Each rectangle is saved as a sketch. In an embodiment of the present invention, each line in the profile is assigned a name. The name is then linked with the corresponding flange sketch. Accordingly, handling of the sketch in a computer processor and memory is simplified. In other words, the rectangle can be saved with a sketch having the name of the corresponding profile line.

Angular constraints are also calculated, in accordance with an aspect of the present invention. Referring to FIG. 6, it can be seen that the angular relationship between each two adjacent lines of the profile 10 is calculated and displayed. In the example of FIG. 6, each pair of adjoining lines includes a 90 degree angle. The sketches corresponding to the adjoining lines from the profile 10 are then linked to the angles between those sketches. For example, the sketches corresponding to lines 2 and 4 include a 90 degree angle.

Figure 7:
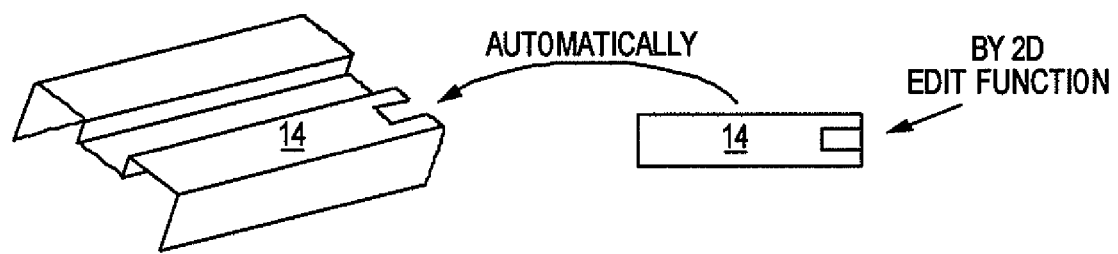
FIG. 7 shows editing of a 3D part by use of a 2D edit function, according to an aspect of the present invention.

Referring to FIG. 7, it can be seen that according to the present invention, editing of a 3D part is straightforward. Because a 2D sketch exists for every flange, the designer need only edit the 2D sketch with a 2D edit operation. The result of the 2D editing will then be transferred to the 3D version of the part.

Although the previous description has been provided with reference to a profile extrusion operation, any other sheet metal feature operation that can generate a 3D part is within the scope and spirit of the present invention. Thus, although line lengths and extrusion lengths were used to determine the dimensions of each sketch, other parameters can be used, depending on the shape of the generated 3D part. Moreover, although the sketches resulting from a profile extrusion are rectangles, the sketches will be a different shape if the sheet metal feature operation generates flanges of shapes other than rectangles.

Figure 8A:
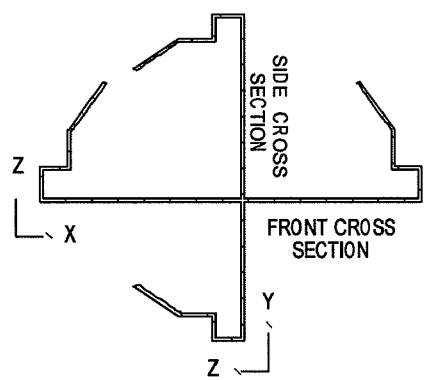
FIGS. 8A, 8B, and 8C show an example of a miter flange operation, in accordance with an aspect of the present invention.

An example of sketch generation for a miter flange operation will now be described with respect to FIGS. 8A, 8B, and 8C. Initially a front cross section is drawn. A side cross section is then drawn. FIG. 8A shows the front and side cross sections drawn by the part designer. As is standard in sheet metal CAD software, the side cross section is drawn rotated 90 degrees from the front cross section.

Figure 8B:
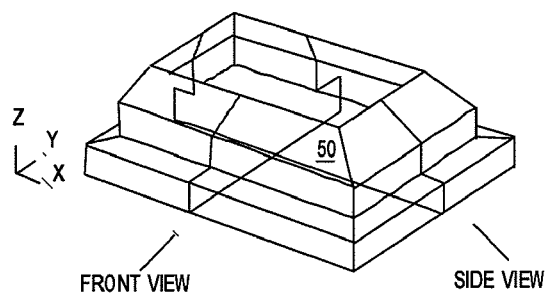
Figure 8C:
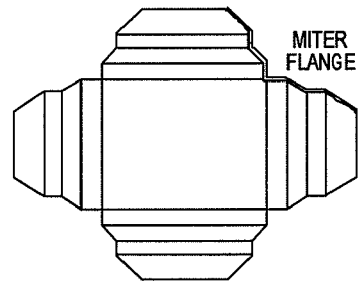

Based upon the front and side cross sections, a sheet metal part is created, as shown if FIG. 8B. Typically, the sheet metal part will include a collision area (not shown). Thus, after detecting the collision area, the system determines how to cut the flat version of the 3D part in order to prevent the collision. FIG. 8C shows in bold where the cut occurred to prevent a collision.

According to the present invention, each face is represented by a sketch. As noted above, not every flange is a rectangle. See for example flange 50. Thus, the geometry of each flange is calculated. The calculated geometry of each flange defines each sketch. The specific calculations are not described in detail because such calculations are well known in the art.

Thus, the present invention generates sketches for every flange of a sheet metal part shape, no matter what type of sheet metal feature operation is used.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. For example, sheet metal feature operations other than profile extrusion operations and miter flange operations can be used to generate the shape. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

What is claimed is:

1. A method for guaranteeing generation of 2D sketches based upon a 3D sheet metal part shape, comprising:
    performing a sheet metal feature operation to create the 3D sheet metal shape, which has multiple flanges to be made by bending operations; and
    generating a separate editable 2D sketch for each flange to facilitate editing the 3D sheet metal shape,
    wherein separate editable 2D sketches for each flange are generated for every type of feature operation used to create the 3D sheet metal shape, and the 3D metal sheet shape is edited base upon edits made on the separate editable 2D sketches for each flange.

2. The method of claim 1, in which the generating further comprises obtaining parameters based upon the 3D sheet metal shape to generate each 2D sketch.

3. The method of claim 1, further comprising linking constraint parameters of the created 3D sheet metal part shape with each generated sketch.

4. The method of claim 3, in which the linking further comprises linking lengths of lines in the 3D sheet metal shape to lengths of each generated sketch.

5. The method of claim 3, in which the linking further comprises linking angles between selected adjoining lines of the 3D sheet metal shape to corresponding angles between generated sketches.

6. The method of claim 2, in which the sheet metal feature operation comprises a profile extrusion created from a profile and an extrusion length.

7. The method of claim 6, in which the parameters comprise lengths of each line segment in the profile and the extrusion length, each length of a line segment and the extrusion length comprising geometry of one of a plurality of rectangle that corresponds to one of a plurality of sketches, each sketch being associated with one of the line segments.

8. A computer readable medium storing a program for guaranteeing generation of 2D sketches based upon a 3D sheet metal part shape, comprising:
    a sheet metal feature operation code segment that performs a sheet metal feature operation to create the 3D sheet metal shape, which has multiple flanges to be made by bending operations; and
    a sketch generating code segment that generates a separate editable 2D sketch for each flange to facilitate editing the 3D sheet metal shape,
    wherein separate editable 2D sketches are generated for each flange for every type of feature operation used to create the 3D sheet metal shape, and
    the 3D metal sheet shape is edited base upon edits made on the separate editable 2D sketches for each flange.

9. The medium of claim 8, in which the sketch generating code segment further comprises a parameter code segment that obtains parameters based upon the 3D sheet metal shape to generate each 2D sketch.

10. The medium of claim 8, further comprising a linking code segment that links constraint parameters of the created 3D sheet metal part shape with each generated sketch.

11. The medium of claim 10, in which the linking code segment links lengths of lines in the 3D sheet metal shape to lengths of each generated sketch.

12. The medium of claim 10, in which the linking code segment links angles between selected adjoining lines of the 3D sheet metal shape to corresponding angles between generated sketches.

13. The medium of claim 9, in which the sheet metal feature operation comprises a profile extrusion created from a profile and an extrusion length.

14. The medium of claim 13, in which the parameters comprise lengths of each line segment in the profile and the extrusion length, each length of a line segment and the extrusion length comprising geometry of one of a plurality of rectangles that corresponds to one of a plurality of sketches, each sketch being associated with one of the line segments.

15. A computer executing software for guaranteeing generation of 2D sketches based upon a 3D sheet metal part shape, comprising:
    memory; and
    a processor that performs a sheet metal feature operation to create the 3D sheet metal shape, which has multiple flanges to be made by bending operations in response to a user's input; and generates a separate editable 2D sketch for each flange to facilitate editing the 3D sheet metal shape,
    wherein separate editable 2D sketches are generated for each flange for every type of feature operation used to create the 3D sheet metal shape, and
    the 3D metal sheet shape is edited base upon edits made on the separate editable 2D sketches for each flange.

16. The computer of claim 15, in which the processor obtains parameters based upon the 3D sheet metal shape to generate each 2D sketch.

17. The computer of claim 15, in which the processor links constraint parameters of the created 3D sheet metal part shape with each generated sketch.

18. The computer of claim 17, in which the processor links lengths of lines in the 3D sheet metal shape to lengths of each generated sketch.

19. The computer of claim 17, in which the processor links angles between selected adjoining lines of the 3D sheet metal shape to corresponding angles between generated sketches.

20. A method for guaranteeing generation of 2D sketches based upon a 3D sheet metal part shape, comprising:
    performing a sheet metal feature operation to create the 3D sheet metal shape, which has multiple flanges to be made by bending operations; and
    generating and displaying a separate editable 2D sketch for each flange to facilitate editing the 3D sheet metal shape,
    wherein separate editable 2D sketches for each flange are generated for every type of feature operation used to create the 3D sheet metal shape, and
    the 3D metal sheet shape is edited base upon edits made on the editable separate 2D sketches for each flange.

* * * * *

UNITED STATES PATENT AND TRADEMARK OFFICE
CERTIFICATE OF CORRECTION

PATENT NO.        : 7,813,901 B2
APPLICATION NO.   : 10/971125
DATED             : October 12, 2010
INVENTOR(S)       : S. Sakai It is certified that error appears in the above-identified patent and that said Letters Patent is hereby corrected as shown below:

On the Cover Page, Other Publications, page 3, (Column 2, line 11) "Los Angles" should be --Los Angeles--.

Signed and Sealed this
Twenty-fifth Day of January, 2011

David J. Kappos
*Director of the United States Patent and Trademark Office*